United States Patent [19]
Heath

[11] Patent Number: 5,974,882
[45] Date of Patent: *Nov. 2, 1999

[54] IDENTIFICATION OF RESONANT FREQUENCIES OF VIBRATION OF ROTATING BLADES

[75] Inventor: Steven Heath, Derby, United Kingdom

[73] Assignee: Rolls-Royce plc, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/912,002

[22] Filed: Aug. 15, 1997

[30] Foreign Application Priority Data

Aug. 29, 1996 [GB] United Kingdom .................. 9618096

[51] Int. Cl.⁶ .................................................. G01H 13/00
[52] U.S. Cl. .............................................................. 73/579
[58] Field of Search ........................... 73/660, 579, 583; 416/223 A, 500; 702/56

[56] References Cited

U.S. PATENT DOCUMENTS

| | | | |
|---|---|---|---|
| 4,389,891 | 6/1983 | Fournier | 73/579 |
| 4,776,216 | 10/1988 | Barton et al. | 73/660 |
| 4,887,468 | 12/1989 | McKendree et al. | 73/660 |
| 4,924,706 | 5/1990 | Moore | 73/579 |
| 4,934,192 | 6/1990 | Jenkins | 73/660 |
| 4,996,880 | 3/1991 | Leon et al. | 73/660 |
| 5,148,711 | 9/1992 | Twerdochlib et al. | 73/660 |
| 5,152,172 | 10/1992 | Leon et al. | 73/579 |
| 5,206,816 | 4/1993 | Hill et al. | 364/508 |

OTHER PUBLICATIONS

"International Gas Turbine Conference" 1983 pp. 953–960.
"Measurement of Resonance Vibrations of Turbine Blades with Elura Device" Foreign Technology Division Jun. 15, 1978.

*Primary Examiner*—Hezron Williams
*Assistant Examiner*—Richard A. Moller
*Attorney, Agent, or Firm*—W. Warren Taltavull; Farkas & Manelli PLLC

[57] ABSTRACT

A method for determining the resonant frequency of vibration of a rotating blade comprises determining the approximate resonance frequency and rotating a blade at a plurality of frequencies in a range above and below the approximate frequency. At each frequency two measurements are taken representative of synchronous amplitudes at each measurement point ($P_1$ and $P_2$) wherein the two points are separated by an angle β and there are an unknown number x of complete synchronous vibrations between the two points. A set of data is provided and a plot of $P_1$ and $P_2$ produced, the data being analysed to determine a likely value of x and hence the resonant frequency.

7 Claims, 8 Drawing Sheets

10 DEGREE SENSOR SEPARATION

20 DEGREE SENSOR SEPARATION

60 DEGREE SENSOR SEPARATION

90 DEGREE SENSOR SEPARATION

IDENTIFICATION OF RESONANT FREQUENCIES OF VIBRATION OF ROTATING BLADES

This is a International Appln. No. 9618096.3 filed Aug. 29, 1996 which designated the U.S.

THE FIELD OF THE INVENTION

BACKGROUND OF THE INVENTION

The invention relates to a method and apparatus for determining the resonant frequencies of vibration of rotating blades, particularly those in turbo-machines.

During operation of a turbo-machine, its rotating blades vibrate at frequencies which coincide with integer multiples (harmonics) of the assembly rotation frequency (the frequency of rotation of the rotor on which the blades are mounted) This vibration is referred to as synchronous vibration, or the synchronous response of the blades. The synchronous response can be characterised by its amplitude and its frequency, with the frequency always being equal to the assembly rotation frequency multiplied by an integer known as the order of the response.

Turbine blades have a tendency to vibrate at large amplitudes at certain natural or resonant frequencies. These resonant frequencies would usually be associated with a particular natural movement of the blade or combination of movements of the blade. For example, one resonant frequency might represent vibration of the blade along the rotational axis of the turbine and another might represent vibration perpendicular to the rotational axis of the turbine.

If the assembly rotation frequency has harmonics which coincide with any of the resonant frequencies of vibration of the turbine blades, synchronous vibrations will occur at these resonant frequencies. Thus, the amplitudes of the synchronous vibrations will be high.

When the amplitude of vibration of the blades exceeds a certain level, excessive stresses are generated in the blades, which suffer from damage and may even fracture. Thus, it is very important to know what are the resonant frequencies of vibration of the blades and prevent vibration taking place at these frequencies.

It is known to obtain information about the amplitude and frequency of vibration of rotating blades by recording the time at which a blade passes a stationary probe. This time is compared with the time at which the blade would have passed the probe if it were undergoing no vibration. This is termed the "expected arrival time" and can be calculated from the rotational position of the particular blade on the rotor in conjunction with a "once per revolution" or "OPR" signal which provides information about the position of the rotor. This OPR signal is derived from the time at which an indicator on the rotor passes a reference sensor, and its use is well known in the art.

The difference between the expected arrival time and the actual arrival time can be multiplied by the turbine blade tip velocity to give the displacement of the blade from its expected position. Data from a plurality of sensors can be processed to obtain the amplitudes and frequencies of vibration of the blades.

It is known that synchronous vibrations of order E can be characterised using 2×E+3 near-equispaced sensors, each measuring times of blade tip passage. Equispaced sensors provide uniformly sampled data which can be analysed using standard frequency domain processing techniques. A tip timing system using 50 sensors has been demonstrated (Endoh, M; Matsuda, Y; and Matsuki, M: "Noncontact Measurement of Rotating Blade Vibrations", presented at International Gas Turbine Congress 1983). However as the number of measurement points increases, probe installation becomes difficult and data acquisition hardware costs prohibitive. It is therefore highly desirable to reduce the number of sensors required to provide amplitude and frequency information.

The maximum synchronous response amplitude can be derived using measurements taken from a single sensor (Zablotskiy,I. Ye. and Korostelev, Yu. A., "Measurement of Resonance Vibrations of Turbine Blades with the ELURA Device", Energomashinostroneniye, pp 36–39, 1970). However, no response frequency information can be derived from this single sensor measurement.

SUMMARY OF THE INVENTION

The invention provides a method for determining a resonant frequency of vibration of a rotating blade, the method comprising the steps of: determining the approximate resonance frequency; rotating the blade at each of a plurality of frequencies in a range from below to above the approximate resonance frequency; and at each frequency:

taking a first measurement $P_1$ representative of synchronous vibrational amplitude at a first point, and taking a second measurement $P_2$ representative of synchronous vibrational amplitude at a second point wherein the first and second points are separated by an angle $\beta$ swept by the blade; and wherein the rotating blade undergoes an unknown number x of complete synchronous vibrations between the first and second points;

to provide a set of data comprising the plurality of frequencies and for each frequency a measurement $P_1$ and a measurement $P_2$, wherein if a plot of $P_1$ against $P_2$ is produced, certain characteristics of the plot depend on x; analysing the set of data to determine a likely value of x; and from x and $\beta$ calculating the resonant frequency of vibration.

Using this method, it is possible to determine the resonant frequencies of vibration of turbine blades using readings taken from only two sensors. The method is based on the realisation that the relationship between $P_1$, $P_2$ and blade rotational frequency is dependent on the number x of complete wavelengths of the vibration between the two measurement points.

The range of frequencies over which the analysis should take place can be determined from a plot of response amplitude at a single measurement point against frequency. This plot shows the range of frequencies over which the resonant vibration is excited Preferably, the analysis of the set of data involves plotting $P_1$ against $P_2$ for a range of different blade rotational frequencies and analysing the resulting shape. The resulting shape can be approximated to an ellipse (although it is not a true ellipse) whose axis ratio can be related to the measurement point separation, where measurement point separation in radians is equal to $2\pi x$ (i.e. the measurement point separation in radians is equal to $2\pi$ multiplied by the number of vibrational wavelengths between the first and second points). The relationship between axis ratio and measurement point separation may have been worked out previously using finite element analysis techniques, or experimental methods.

Once the measurement point separation has been determined, this may be used to calculate the order of the synchronous vibrations, the order being equal to $$\frac{2\pi x}{\beta}.$$

The vibrational frequency of the resonance may then be calculated using the following equation:

$$\text{response frequency} = \frac{E\Omega}{60} \text{ Hz}$$

where $\Omega$ is the mean rotational speed of the blade, in revolutions per minute, over which the response occurs.

The invention also provides apparatus for determining a resonant frequency of vibration of a rotating blade, the apparatus comprising: a first sensor for taking a first measurement $P_1$ representative of synchronous vibrational amplitude of a rotating blade at a first point: a second sensor for taking a second measurement $P_2$ representative of synchronous vibrational amplitude of the rotating blade at a second point, wherein the first and second points are separated by an angle $\beta$ swept by the blade; and wherein there are an unknown number x of synchronous vibration wavelengths between the first and second points; means for storing the measurements from the first and second sensors as a set of data comprising the plurality of frequencies and for each frequency a measurement $P_1$ and a measurement $P_2$, wherein if a plot of $P_1$ against $P_2$ is produced, certain characteristics of the plot depend on x; and means for calculating from x and $\beta$ the resonant frequency of vibration.

BRIEF DESCRIPTION OF THE DRAWINGS

The present invention will now be described with reference to the accompanying drawings.

DETAILED DESCRIPTION OF THE INVENTION

The newly discovered relationship between the amplitude measurements $P_1$ and $P_2$ and measurement point separation is explained as follows.

Assuming that the blade tip vibration can be considered a single degree of freedom system:
Blade Tip Response Amplitude, $$X = (A(\omega)) \sin(\omega t + \phi(\omega)) \quad [1]$$

where $A(\omega)$ is the response amplitude function
where $A(\omega)$ is the response amplitude function $$A(\omega) = \frac{K}{\sqrt{(\omega_o^2 - \omega^2)^2 + \left(\frac{(\omega \omega_o^2)^2}{Q}\right)^2}} \quad [2]$$

and $\phi(\omega)$ is the response phase $$\varphi(\omega) = \tan^{-1}\left(\frac{-\omega \omega_o}{Q(\omega_o^2 - \omega^2)}\right) \quad [3]$$

where K is the response amplitude scaling factor $\omega_o$ is the single degree of freedom undamped resonance frequency (SDOF) (radians/s);

$\omega$ is the assembly excitation frequency (radians/s); and

Q is the SDOF resonance Q factor.

Thus, for any particular assembly excitation frequency, the blade tip vibration describes a sine wave, with a maximum amplitude of $A(\omega)$. The blade tip vibration lags or leads the assembly excitation by an amount $\phi(\omega)$.

It can be seen that when the assembly excitation frequency $\omega$ is equal to the resonant frequency $\omega_o$ the maximum amplitude $A(\omega)$ is large (because the term $\omega_o^2 - \omega$ equals zero). In this situation, $\phi(\omega) = -90°$. Thus, at resonance the vibration of the blade is of high amplitude and lags the assembly excitation by 90°.

Figure 1:
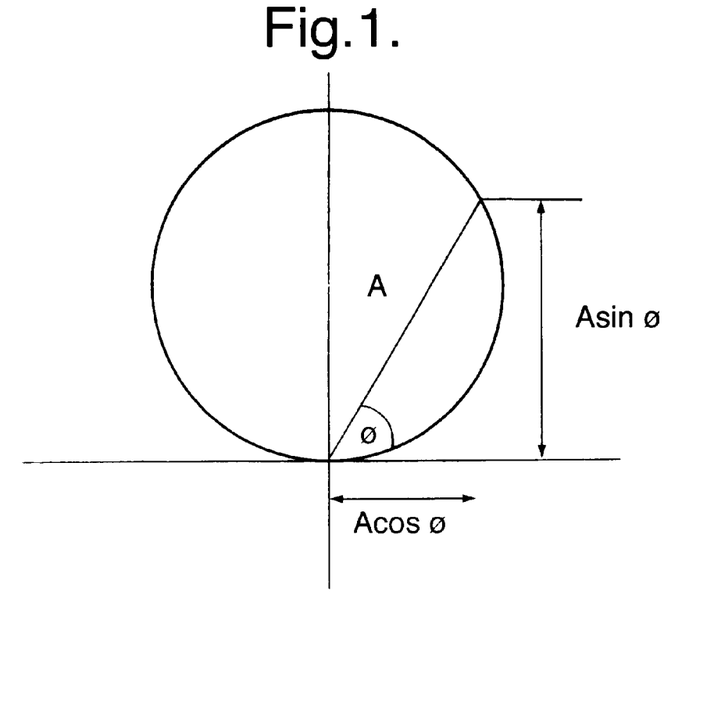
FIG. 1 is a polar plot of response amplitude and response phase for a single degree of freedom system.

If ($\omega$) is varied from below $\omega_o$ to above $\omega_o$, a polar plot of $A(\omega)$ and $\phi(\omega)$ approximates to a circle, as shown in FIG. 1.

Figure 2:
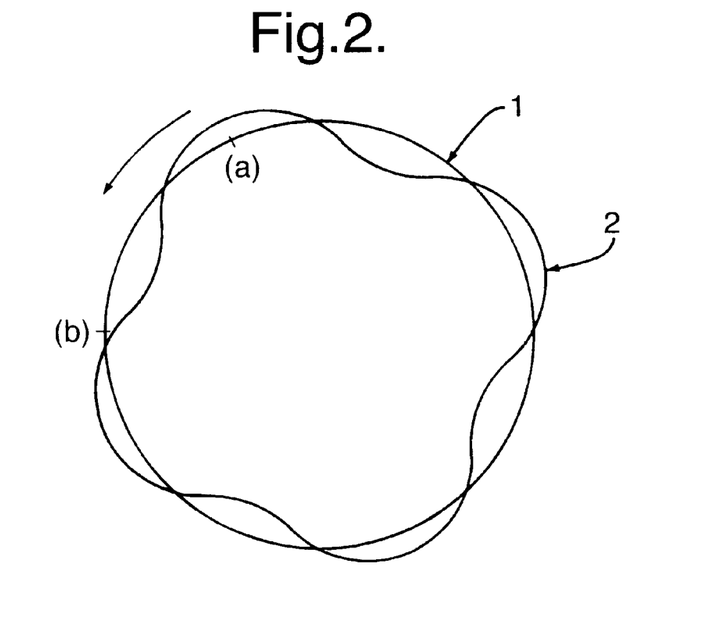
FIG. 2 is a schematic representation in the stationary reference frame of a synchronous vibration of a blade as it rotates.

For a synchronous response of order E, the frequency of vibration of the blade tip is always equal to E times the frequency of rotation of the blade or assembly excitation frequency. Thus, there are always a whole number of tip vibration wavelengths around the circle described by the blade, as shown in FIG. 2 where the path labelled 1 represents a blade tip undergoing no vibration and the path labelled 2 the blade tip undergoing synchronous vibration of order 4. At any particular fixed point on the circle described by the blade, the blade tip is always at the same location on its sine wave. For example, at point (a) in FIG. 2, the blade tip will always be at its maximum amplitude of vibration, while at point (b) it will always be much nearer its mid point. Therefore, for a particular assembly excitation frequency the observed blade tip response at point (a) or point (b) does not depend on the time at which it is recorded.

Figure 3A:
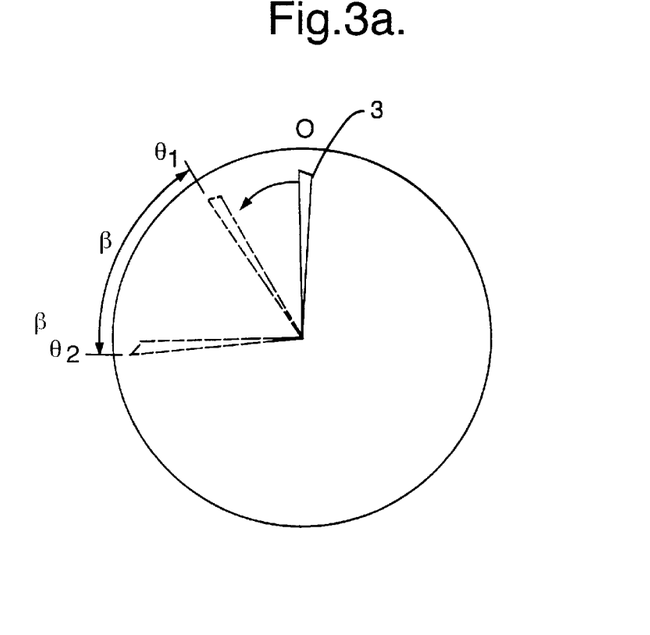
FIGS. 3A and 3B show the measurement of vibration amplitude at two different points separated by an angle $\beta$ swept by the rotor.
Figure 3B:
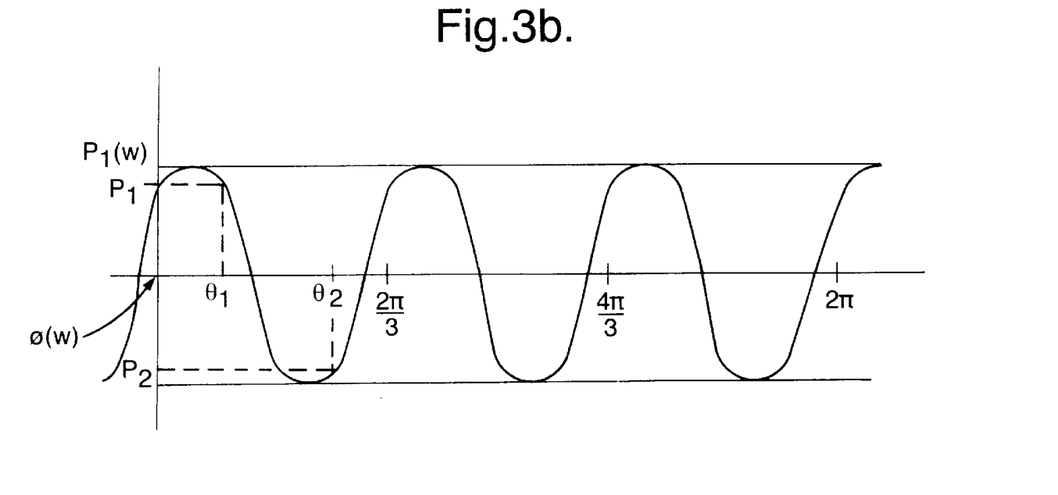

FIGS. 3A and 3B represent a blade undergoing an order E vibration, where E is equal to 3. We are considering the response of a single blade 3 as it rotates and undergoes synchronous vibrations.

Consider the response at two points separated by an angle α it radians where α is referenced to the response i.e. α=2π when the measurement points are separated by one wavelength of the blade tip vibration. The observed response at the two measurement points is:

Observed blade tip response at first point, $$P_1 = A(\omega) \sin(E\theta_1 + \phi(\omega)) \quad [4]$$

Observed blade tip response at second point, $$P_2 = A(\omega) \sin(E\theta_1 + \phi(\omega) + \alpha) \quad [5]$$

where $[\alpha] = E(\theta_1 - \theta_2)$

The response is not dependent upon time, as explained previously.

For lightly damped structures, such as turbomachinery bladed assemblies, the range of frequencies which cause the amplitude phase characteristic (FIG. 1) to describe a circle is small. This is because such structures have a sharp resonance such that excitation at frequencies not near resonance causes a negligible response.

If the blade is rotated at each of a range of frequencies from below a frequency which causes resonance in the blade to above such a frequency, each particular rotational frequency produces a different value of $P_1$ and $P_2$. This is because the blade vibrational amplitude and phase depends upon blade rotation frequency (Equations (2) and (3)).

If for each rotational frequency $P_1$ is plotted against $P_2$ or vice-versa, each different frequency produces a point on a graph and the points for a range of frequencies around resonance have been found to describe a loop.

Figure 4:
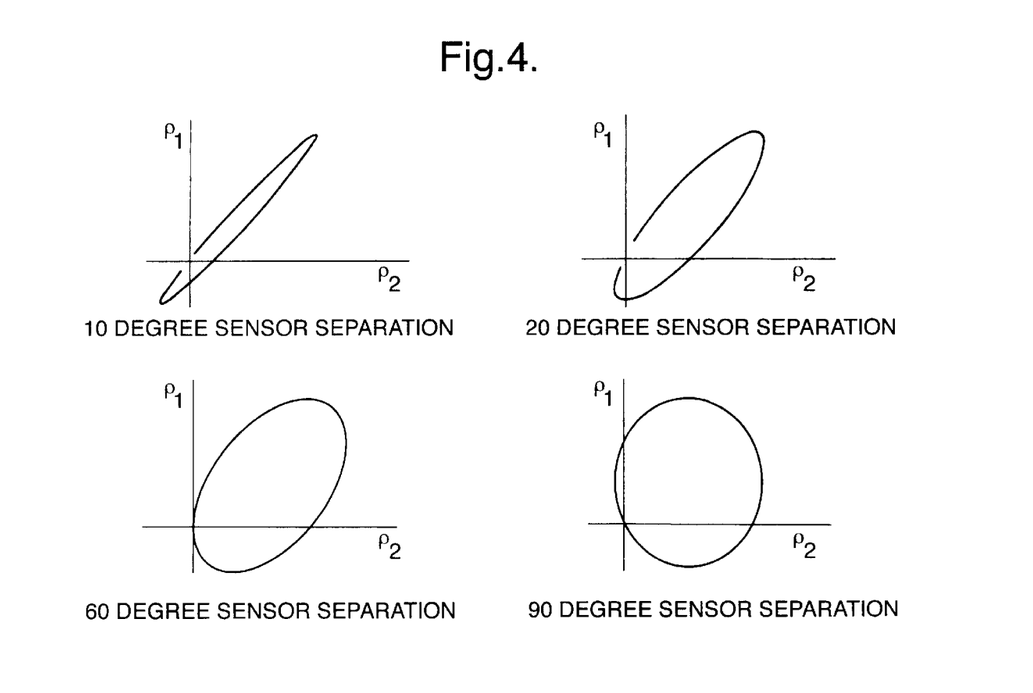
FIG. 4 shows plots of vibrational amplitude $P_1$ and $P_2$ measured at different points for a range of frequencies, each plot showing a different separation of the measurement points.

FIG. 4 shows plots of $P_1$ against $P_2$ obtained from a tip probe arrival time simulator using an assembly response from a finite element model for various probe separations. Each point on the loops represents a reading of $P_1$ and $P_2$ at a different assembly excitation frequency. All assembly excitation frequencies on the loop are quite near a resonant frequency; frequencies far from resonance produce dots around the origin.

Figure 5:
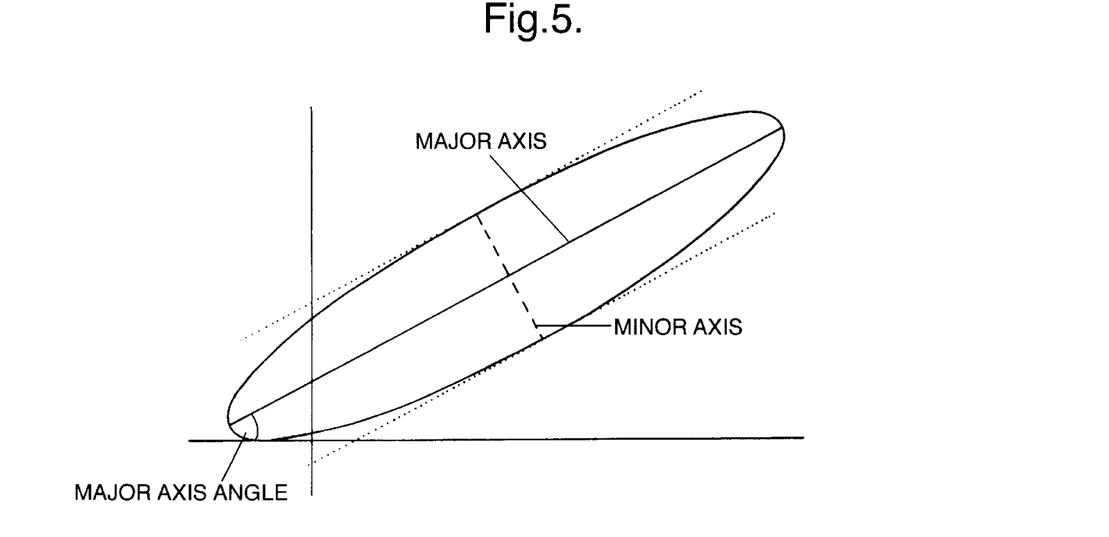
FIG. 5 illustrates the terms which will be used to describe these plots.

These two parameter plots are not ellipses but will be described using the following terms illustrated in FIG. 5:

| | |
|---|---|
| Major axis: | line connecting two points on plot separated by the maximum straight line distance; |
| Minor axis: | maximum separation of points on plot, normal to major axis; |
| Major axis angle: | angle between major axis and horizontal response parameter axis, and |
| Axis ratio: | Length of minor axis / Length of major axis |

The precise location of the loops in relation to the origin depends on the position of the points $P_1$ and $P_2$ and particularly their phase relationship with the assembly excitation frequency and their angular position on the response. However, the shape of the loops has been found to depend on measurement point separation only, subject to some inaccuracies discussed later. This dependence can be seen in FIG. 4.

Initial investigation of the form of the two parameter plots used a single degree of freedom assembly response model with a resonant frequency of 120 Hz and Q factor of 50. A response of order 3 was assumed and the 120 Hz resonance traversed by linearly changing assembly rotation rate from 2000 to 7000 RPM in 240s. The model amplitude scaling was set to give a relative response amplitude of 0.00014. The relative response amplitude is the ratio of peak response amplitude to assembly tip radius, and a low relative response amplitude minimises the difference between actual response phase changes and measured response phase changes as dicsussed later. Initially zero noise and offset were used.

The two parameter plots obtained using the model for different measurement point separation were analysed as follows. First the major axis and major axis angle were found by considering the straight line distance between all points in the plot. Secondly a linear transformation which placed the mid point of the major axis at the origin in the XY plane and aligned the major axis with the X axis was applied to all points in the plot. The length of the major axis was taken as the difference between the maximum and minimum X values in the transformed plot and the length of the minor axis was taken as the maximum difference between the maximum and minimum Y values at a given X value in the transformed plot. From the resulting minor and major axis lengths the axis ratio was calculated.

Figure 6:
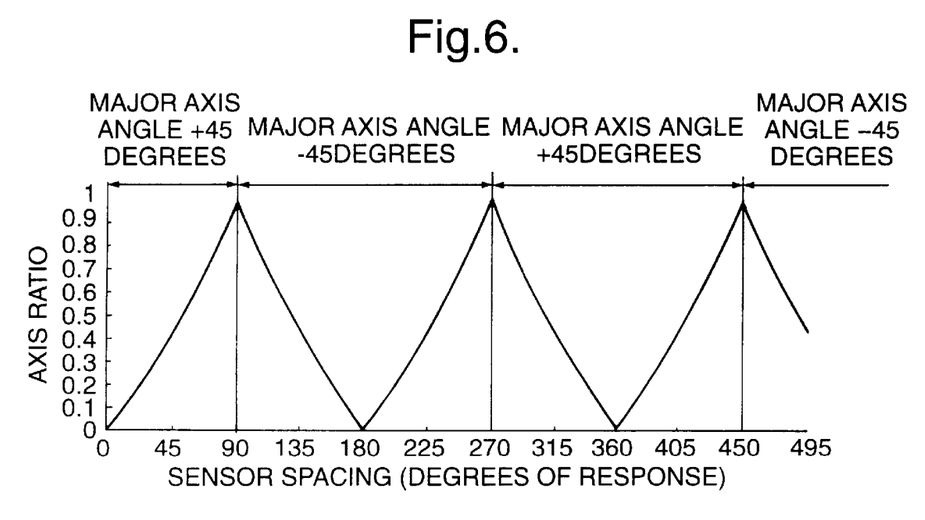
FIG. 6 shows the relationship between axis ratio and measurement point spacing.

A relationship was found between measurement point separation and the two parameter plot axis ratio and major axis angle. The relationship was independent of the location of the first measurement point on the response and is shown in FIG. 6. In FIG. 6, the major axis angle is undefined for sensor spacing 90° and 270° which is to be expected as the two parameter plots are circles at these sensor spacings. Identical results were obtained for response measurements on a multi-degree of freedom tuned bladed assembly model with the same relative response amplitude.

Figure 7:
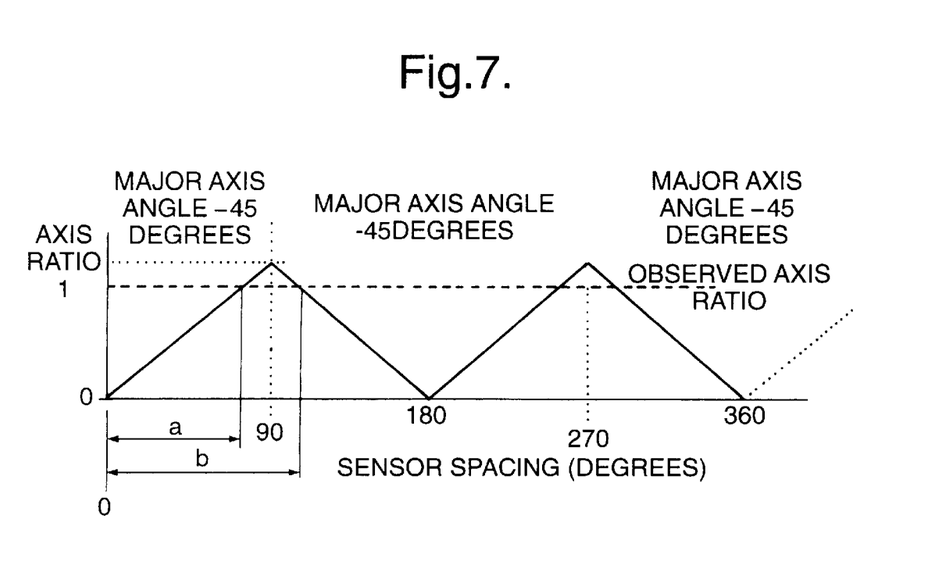
FIG. 7 shows a useful straight line approximation of FIG. 6.

In practice, the graph of FIG. 6 can be approximated to a straight line graph as shown in FIG. 7. Axis ratio and major axis angle can be determined from a two parameter plot and, using FIG. 7, measurement point separation can then be derived. Referring to FIG. 7, for major axis angles of +45 degrees, the measurement point separation α is given by:

$$\alpha = a + 2\beta n \text{ or } \alpha = 2\pi(n+1) - a \text{ where } n = 0,1,2,3$$

and for major axis angles of −45°:

$$\alpha = b + 2\pi n \text{ or } \alpha = 2\pi(n+1) - b \text{ where } n = 0,1,2,3$$

For measurement points separated by an angle β on the a of the assembly, the order of the response, E, is α/β.

For example, if the measurement point separation α were 2π, it would represent precisely one wavelength of the blade tip vibration. If the measurement points were separated by an angle β of 120° on the assembly casing, this would mean that there were three complete blade tip vibrations in any one rotation of the blade assembly. Hence the order E would be 3. This would make the response frequency equal to three times the assembly excitation frequency at which the resonance occurs. This assembly excitation frequency is determined from the mean rotation speed, Ω in rpm, over which the response occurs.

$$\text{Response frequency} = \frac{E\Omega}{60} \text{ Hz.}$$

Although there is a range of possible values of a depending on the value of n, E must always be a positive integer greater than or equal to 1. If a number of values of α satisfy this condition, knowledge of the expected response is necessary to identify the most probable response frequency.

In practice, a graph such as that of FIG. 7 would be used to determine measurement point spacing. However, direct calculation is possible, as follows.

The relationship between measurement point separation and axis ratio and major axis angle repeats at measurement point seperation intervals of 360°. With each 360° interval four regions can be defined as follows:

| Region | Measurement Point Separation Range |
|---|---|
| 1 | 0–90° |
| 2 | 90°–180° |
| 3 | 180° to 270° |
| 4 | 270° to 360° |

These regions also repeat at measurement point separation intervals of 360°.

Within each region there is an almost linear relationship between measurement point separation and axis ratio. To enable direct calculation of measurement point separation a third order polynomial fit of axis ratio to measurement point separation was performed for each region. The following equation defines the polynomial used and the table below gives the polynomial coefficients for each region.

Measurement point separation=$Px$ (Axis ratio)$^3$+$Qx$(Axis ratio)$^2$+ $Rx$(Axis ratio)+$S$ where the polynomial coefficients for each of the four regions are as follows:

| Region | P | Q | R | S |
|---|---|---|---|---|
| 1 | −7.22644 | −21.82787 | 119.08946 | −0.16976 |
| 2 | 7.27262 | 21.84211 | −119.16418 | 180.17559 |
| 3 | −7.28363 | −21.82579 | 119.15622 | 179.82559 |
| 4 | 7.21876 | 21.84879 | −119.10273 | 360.17127 |

Possible Inaccuracies in the Method

As discussed previously with reference to FIG. 2, the synchronous vibrational response of the blades has a frequency which is an integral multiple of the excitation frequency. Thus, there are always a fixed number of wavelengths of the response around the whole sweep of the rotating blade. This means that provided the order of the response remains constant, the measurement point separation should not depend upon excitation frequency, although the amplitude measurements $P_1$ and $P_2$ change with frequency.

It has been found however that the maximum amplitude of the response or peak response amplitude affects the axis ratio and major axis angle of the two parameter plots The following table shows these variations.

| Peak response amplitude Assembly tip radius (= Relative response amplitude) | Axis Ratio | Major Axis Angle (degrees) |
|---|---|---|
| 0.00014 | 0.7003 | 45.06 |
| 0.0014 | 0.7019 | 45.08 |
| 0.014 | 0.718 | 45.33 |
| 0.042 | 0.759 | 46.74 |

When the relative response amplitude is low (i.e. the vibrations are small) the two parameter plots give more accurate results. The plot tends to be more symmetrical about their major and minor axes at such low relative response amplitudes. The inaccuracies at high relative responses are significant given that a relative response amplitude of 0.042 is representative of experimentally observed assembly responses.

Figure 8A:
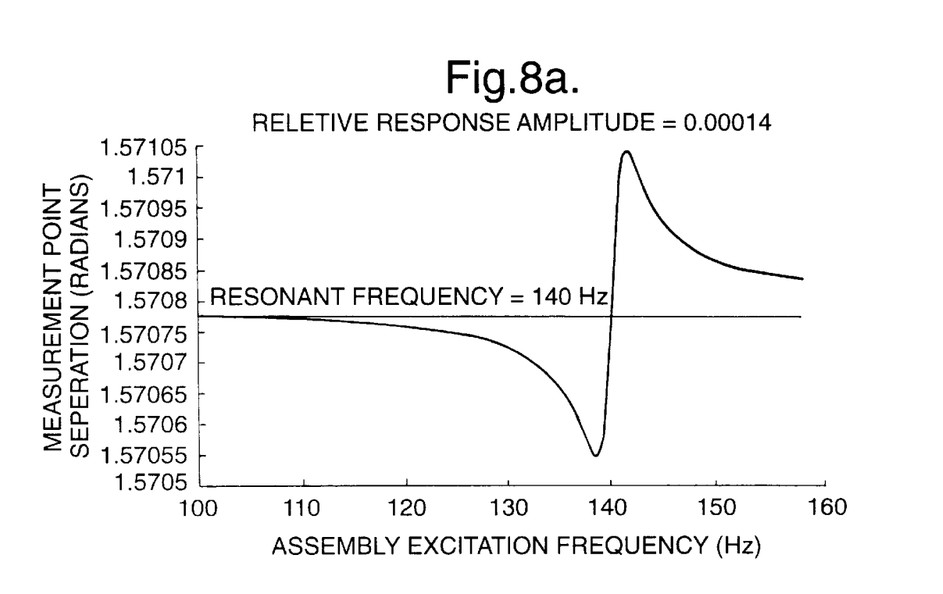
FIGS. 8A and 8B shows the variation of measurement point separation with frequency, for a nominal measurement point separation of $\pi/2$, and for two different relative response amplitudes.
Figure 8B:
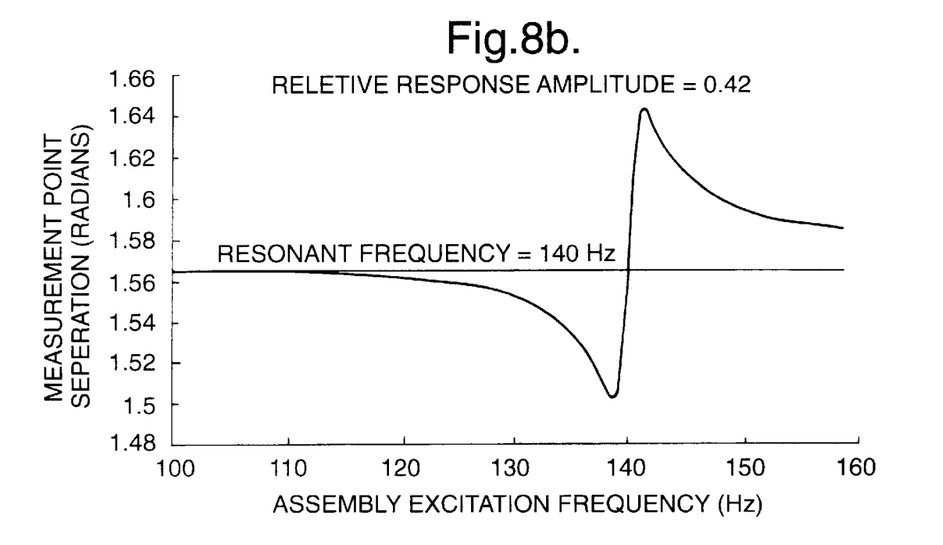

The observed variations in axis ratio and major axis angle at different response amplitudes are attributed to differences between actual and measured response phases. Given that the two parameter plots are produced from response amplitude measurements at different locations on the response, the changes in measured response phase at each location will be different as response amplitude increases. FIGS. 8A and 8B show the calculated measurement point separation as the assembly excitation frequency is taken from below to above resonance, for a nominal measurement point separation of $\pi/2$. It can be seen that when the relative response amplitude is low (0.00014 in FIG. 8A) the calculated measurement point separation stays very close to the nominal value. When the relative response amplitude is high (0.042 in FIG. 8B), the calculated measurement point separation varies from around 1.5 radians just before resonance to around 1.64 just after resonance.

The response amplitude can be determined to an accuracy of ±10% using prior art methods, taking readings from a single sensor. Therefore, the effect of relative response amplitude can be partially corrected.

Figure 9:
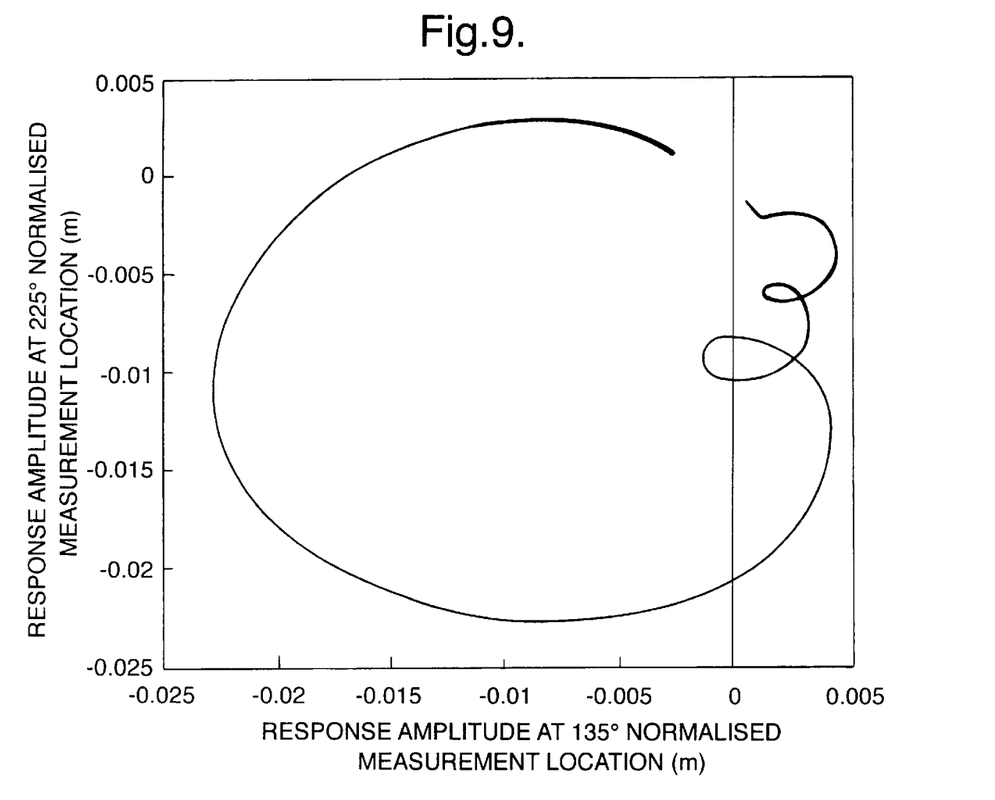
FIG. 9 shows a two parameter plot for a mistuned assembly response.

Mistuning, or small blade to blade manufacturing differences, will cause the blades to have dramatically different response levels and the assembly to exhibit many close modes. Two parameter plots such as that illustrated in FIG. 9 result. The close modes produced by mistuning distort the plot by producing additional small loops, shown on the right of the plot. However, the dominant assembly response can be identified from the dominant circle in the plot. Correction of axis ratio and major axis angle using the response amplitude is affected by the dependence of single parameter derived response amplitude on mistuning.

Application of Two Parameter Plot Analysis to Experimental Data

Figure 10:
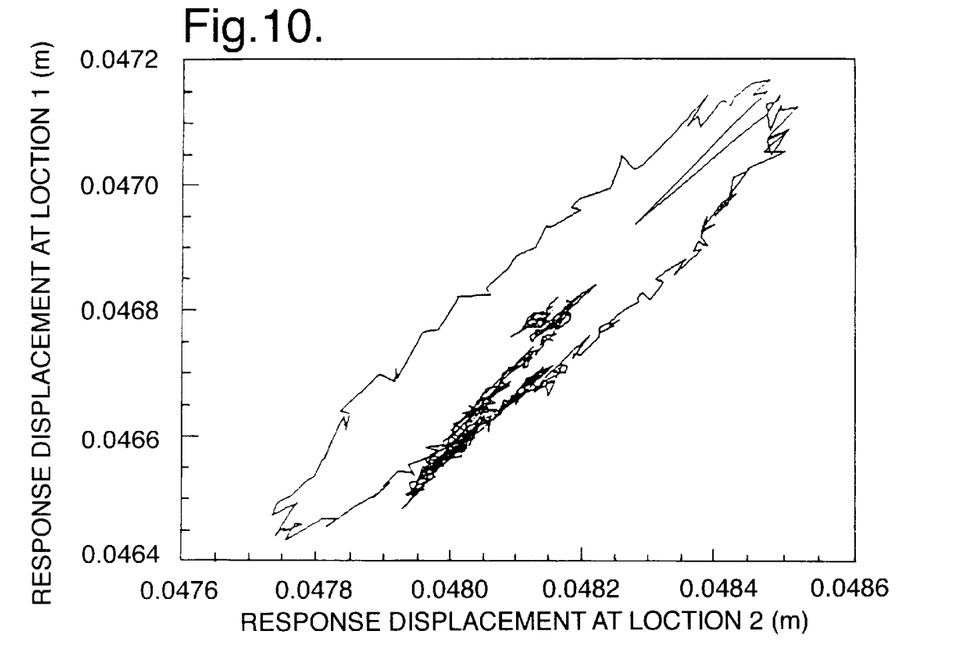
FIG. 10 shows an experimentally determined two parameter plot for a first blade.
Figure 12:
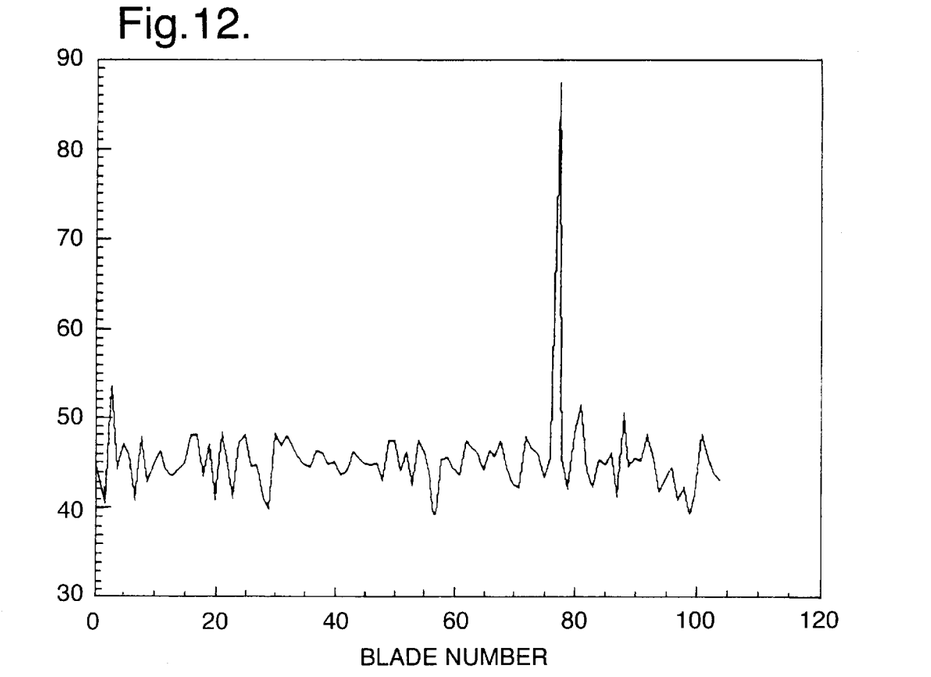
FIG. 12 shows two parameter plot axis angle against blade number for a whole row of blades.
Figure 13:
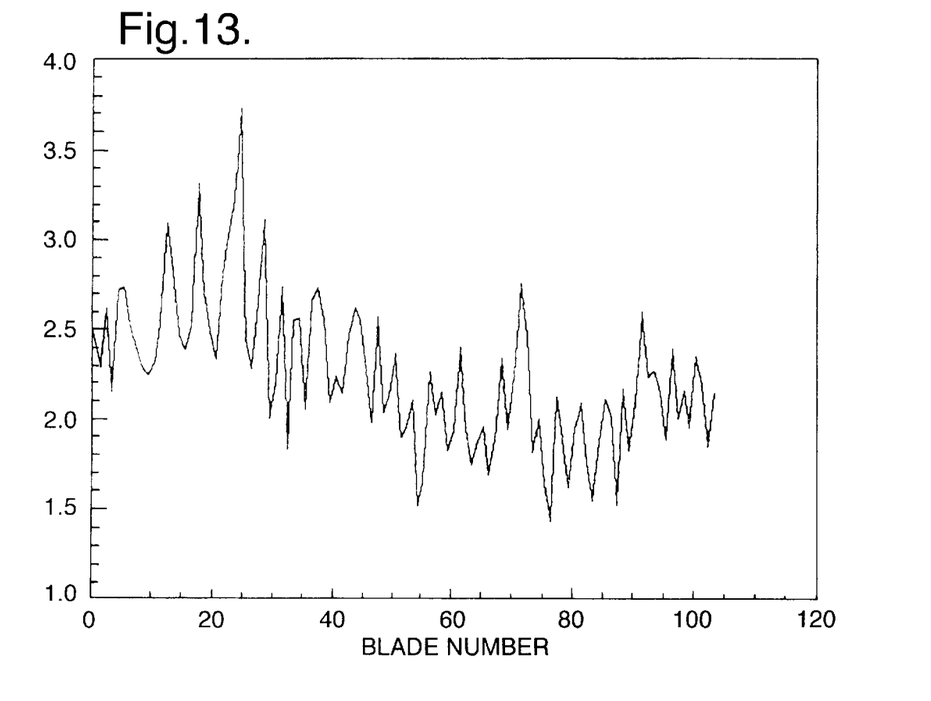
FIG. 13 shows response order determined from a two parameter plot against blade number for a whole row of blades.

Response measurements were acquired from a bladed assembly with engine ordered forcing. Strain gauge measurements on the assembly showed a 2 nodal diameter engine ordered response in the region of interest. FIG. 10 shows a plot of the two tip timing response measurements for a single blade. The two parameter plots for all blades were analysed and FIGS. 12 and 13 show the axis angle and response order derived from the plot axis ratio and ratio to angular separation curve of FIG. 6.

Figure 11:
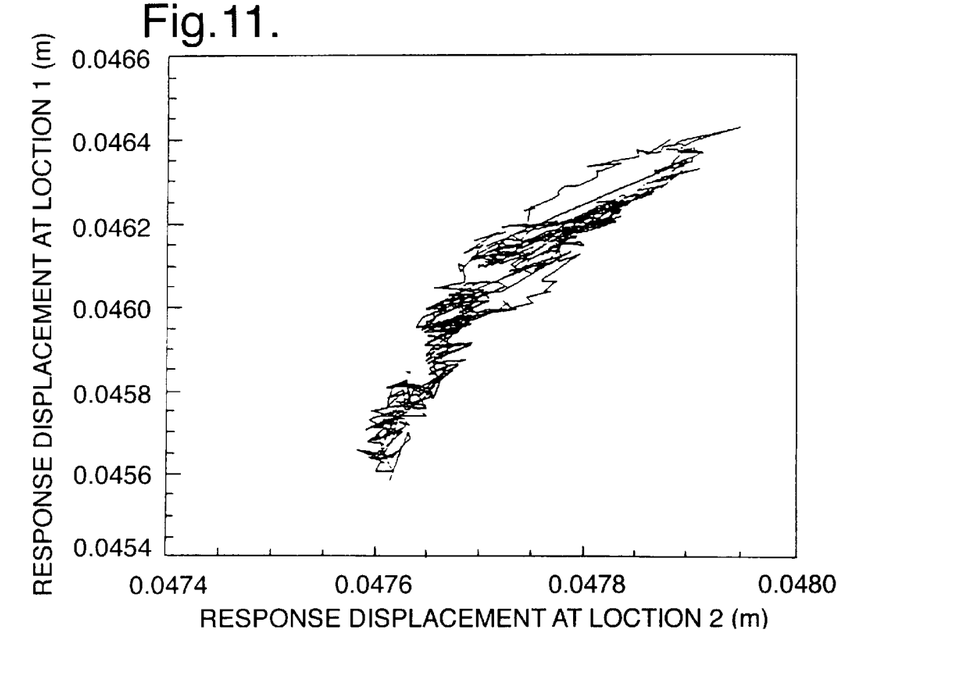
FIG. 11 shows an experimentally determined two parameter plot for a second blade; having a smaller amplitude of vibration than the first blade.

The accuracy of the technique depends on the uncertainty in the measured response. FIG. 10 illustrates the blade with the largest response amplitude in the experimentally acquired data set. Mistuning results in varying response levels between blades. FIG. 11 shows the two parameter plot for the lowest response amplitude blade—analysis of this plot will be inaccurate. Practical application of the method will require processing of the plots prior to extracting the axis ratio and angle technique.

I claim:

1. A method for determining a resonant frequency of vibration of a rotating blade, the method comprising the steps of: determining the approximate resonant frequency; rotating the blade at each of a plurality of frequencies in a range from below to above the approximate resonant frequency; and at each frequency:

taking a first measurement $P_1$ representative of synchronous vibrational amplitude at a first point, and taking a second measurement $P_2$ representative of synchronous vibrational amplitude at a second point wherein the first and second points are separated by an angle β swept by the blade; and wherein there are an unknown quantity x of synchronous vibrations between the first and second points to provide a set of data comprising the plurality of frequencies and for each frequency a measurement $P_1$ and a measurement $P_2$, so that a plot of $P_1$ against $P_2$ will display that features of the plot depends on x; and from x calculating the resonant frequency of vibration.

2. A method according to claim 1 wherein the analysis of the set of data involves plotting $P_2$ against $P_1$ for another range of different frequencies than said plurality of frequencies and analysing the resulting different set of data to devise the resonant frequency.

3. A method according to claim 2 wherein the different set of data when plotted can be approximated to an ellipse and the analysis involves a determination of the axis ratio and major axis angle of the ellipse.

4. A method according to claim 3 wherein the analysis includes the use of a graph relating axis ratio to measurement point response separation, where measurement point response separation in radians is equal to $2\pi x$.

5. A method according to claim 4 wherein the graph is prepared using finite element analysis to determine the relationship between axis ratio and measurement point response separation.

6. A method according to claim 1 wherein a frequency of the rotation of the blade is multiplied by an integer known as the order E of the response of the blade and the order of the synchronous vibrations is determined with the order E being equal to $2\pi x/\beta$.

7. A method according to claim 6 where the blade has a response frequency and the vibrational frequency of the resonance is calculated according to the following equation:

$$\text{response frequency} = \frac{E\Omega}{60} \text{ Hz}$$

where $\Omega$ is the mean rotational speed by the blade, in revolutions per minute, over which the response occurs.

* * * * *